United States Patent

Hammoud et al.

(10) Patent No.: US 8,102,417 B2
(45) Date of Patent: Jan. 24, 2012

(54) EYE CLOSURE RECOGNITION SYSTEM AND METHOD

(75) Inventors: Riad I. Hammoud, Kokomo, IN (US); Andrew L. Wilhelm, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 1491 days.

(21) Appl. No.: 11/586,364

(22) Filed: Oct. 25, 2006

(65) Prior Publication Data

US 2008/0101659 A1    May 1, 2008

(51) Int. Cl.
*H04N 5/253* (2006.01)
*G06K 9/00* (2006.01)

(52) U.S. Cl. ............... 348/78; 348/77; 382/117

(58) Field of Classification Search .......... 348/61, 348/63, 77–78; 340/575–576; 382/117
See application file for complete search history.

(56) References Cited

U.S. PATENT DOCUMENTS

| | | | | |
|---|---|---|---|---|
| 5,859,921 A * | 1/1999 | Suzuki | | 382/118 |
| 5,878,156 A * | 3/1999 | Okumura | | 382/118 |
| 6,097,295 A * | 8/2000 | Griesinger et al. | | 340/576 |
| 6,154,559 A * | 11/2000 | Beardsley | | 382/103 |
| 6,243,015 B1 * | 6/2001 | Yeo | | 340/576 |
| 6,571,002 B1 * | 5/2003 | Ogawa | | 382/117 |
| 6,717,518 B1 * | 4/2004 | Pirim et al. | | 340/576 |
| 7,209,574 B2 * | 4/2007 | Tafuku et al. | | 382/103 |
| 7,301,465 B2 * | 11/2007 | Tengshe et al. | | 340/575 |
| 2002/0081032 A1 * | 6/2002 | Chen et al. | | 382/199 |
| 2006/0210121 A1 * | 9/2006 | Nakano et al. | | 382/117 |
| 2007/0009260 A1 * | 1/2007 | Bothwell et al. | | 398/33 |

OTHER PUBLICATIONS

"A Drowsy Driver Detection System for Heavy Vehicles" by Richard Grace et al., 0-7803-5086-3/98 © 1998 IEEE, pp. I36-1 through I36-8.
"Drowsy Driver Monitor and Warning System" by Richard Grace, International Driving Symposium on Human Factors in Driver Assessment, Training and Vehicle Design, Aug. 2001, 7 pages.
"Research on Vehicle-Based Driver Status/Performance Monitoring; Development, Validation, and Refinement of Algorithms for Detection of Driver Drowsiness," U.S. Department of Transportation, National Highway Traffic Safety Administration, Dec. 1994.

* cited by examiner

*Primary Examiner* — Joshua Joo
(74) *Attorney, Agent, or Firm* — Lawrence D. Hazelton

(57) ABSTRACT

A system and method are provided for determining eye closure state of the eye of a subject. The system includes a video imaging camera oriented to generate images of an eye of a subject and a video processor for processing the images generated with the video imaging camera. The video processor is configured to detect an eye in the video images and determine whether the images of the eye are noisy. The video processor processes geometrical and statistical shape of the eye in the images if the eye is not noisy, and processes changes in the size of the eye over time if the images are noisy. The processor further determines eye closure state based on a ratio of horizontal to vertical dimensions.

23 Claims, 8 Drawing Sheets

1

EYE CLOSURE RECOGNITION SYSTEM AND METHOD

TECHNICAL FIELD

The present invention generally relates to video image eye monitoring and, more particularly, relates to an imaging system and method of determining the closure state of the eye(s) of a subject to determine if an eye is in an open or closed state.

BACKGROUND OF THE INVENTION

Various video imaging systems have been proposed for use in vehicles to monitor a subject person, such as the driver or other passenger in the vehicle. Some proposed video imaging systems generally include one or two cameras focused on the driver of the vehicle to capture images of the driver's face. The video images are processed typically using computer vision and pattern recognition techniques to determine various facial characteristics of the driver, including position, orientation and movement of the driver's eyes, face and head. Some proposed eye monitoring systems process the captured images to determine eye closure, such as open and closed states of the eye(s).

By knowing the driver's facial characteristics, vehicle control systems can provide enhanced vehicle functions. For example, a vehicle control system can monitor one or both eyes of the subject driver and determine a condition in which the driver appears to be fatigued or drowsy based on statistical analysis of cumulative results of open or closed state of the eye(s) over time. Standard human factor measures, such as PerClos (percentage of eye closure) and AveClos (average of eye closure), could be used to determine the drowsiness state of the driver. For instance, if the AveClos value is determined to be above a certain threshold, the system may initiate countermeasure action(s) to alert the driver of the driver's drowsy condition and/or attempt to awaken the driver.

Some proposed vision-based imaging systems that monitor the eye(s) of the driver of a vehicle require infrared (IR) illumination along with visible light filters to control scene brightness levels inside of the vehicle cockpit. One such driver monitoring system produces bright and dark eye conditions that are captured as video images which are processed to determine whether the eye is in the open position or closed position. Such prior known driver eye monitor systems typically require specific setup of infrared illuminators on and off the optical camera axis. In addition, the systems are generally expensive, their setup in a vehicle is not always practical, and they may be ineffective when used in variable lighting conditions, especially in bright sunny conditions. Further, variations in eyelash contrast and eye iris darkness levels for different subject persons may cause such prior systems to make erroneous eye state discrimination decisions.

More recent proposed imaging systems are disclosed in U.S. application Ser. Nos. 11/076,600; 11/077,041; and 11/077,042 all filed on Mar. 10, 2005, and assigned to the Assignee of the present application. The aforementioned applications are hereby incorporated herein by reference. The approaches proposed in the aforementioned applications generally detect and process the localized region of the eye in the image and determine whether the eye is in an open or closed state, generally based on geometrical constraints such as the eye. In particular, the height (vertical distance) between the edge boundaries of the eye can be processed to determine whether the eye is in the open or closed state by processing the eye edge boundaries in the image. Such approaches generally rely upon a circular constraint of the eye shape. However, some approaches may exhibit error that could occur when the eye is partially open or when the background of the eye shape is cluttered.

Accordingly, it is therefore desirable to provide for a cost affordable and effective method for monitoring an eye and determining the eye closure state that overcomes drawbacks of the previous approaches. In particular, it is desirable to provide for an eye monitoring system for determining the open or closed states of the eye(s) of a driver of a vehicle that overcomes drawbacks of prior known proposed eye monitoring approaches.

SUMMARY OF THE INVENTION

In accordance with the teachings of the present invention, a system and method are provided for determining closure state of the eye of a subject. According to one aspect of the present invention, the system includes a video imaging camera oriented to generate images of an eye of a subject and a video processor for processing the images generated with the video imaging camera. The video processor detects an eye in the video images and determines if the images are noisy. The video processor determines closure state of the eye based on a shape of the eye in the images if the images of the eye are not noisy, and based on changes in the size of the eye over time if the images of the eye are noisy to determine whether the eye is in an open or closed state.

According to another aspect of the present invention, an eye monitoring system is provided for monitoring an eye of a subject. The system includes a video imaging camera oriented to generate images of an eye of a subject. The system also includes a video processor for processing the images generated with the video imaging camera. The video processor detects an eye in the video images and determines changes in the size of the eye over time, wherein the video processor determines closure state of the eye based on the changes in the size of the eye over time.

According to a further aspect of the present invention, an eye monitoring system is provided having a video imaging camera and a video processor for processing images generated with the video imaging camera. The video processor detects an eye in the video image and determines geometrical shape of the eye in the image including horizontal and vertical dimensions and a ratio of the horizontal to vertical dimensions of the eye. The video processor determines closure state of the eye based on the ratio of horizontal to vertical dimensions of the eye.

According to yet another aspect of the present invention, a method includes the steps of arranging a video imaging camera to generate images of an eye of a subject, and generating images of the eye of the subject. The method also includes the steps of processing the images to identify edge boundaries of the eye in the image, and determining if the image of the eye is noisy. The method determines geometrical shape of the eye if the image of the eye is not noisy. The method also performs a temporal evaluation of the eye. The method further includes the step of determining closure state of the eye in the image as a function of the geometrical shape if the image of the eye is not noisy and as a function of the temporal evolution if the image is noisy. According to further aspects of the invention, the method may include the steps of determining closure state of the eye based on changes in the size of the eye over time or based on a ratio of horizontal to vertical dimensions of the eye.

Accordingly, the system and method according to the present invention effectively determines the closure state of the eye, such as the open eye state or closed eye state, in a manner that overcomes drawbacks of prior approaches. The eye monitoring system is cost affordable and is particularly useful in a vehicle for monitoring the eye(s) of a driver of the vehicle and determining if the driver's eye(s) are open or closed, such that the eye state condition may be utilized in the vehicle operation.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
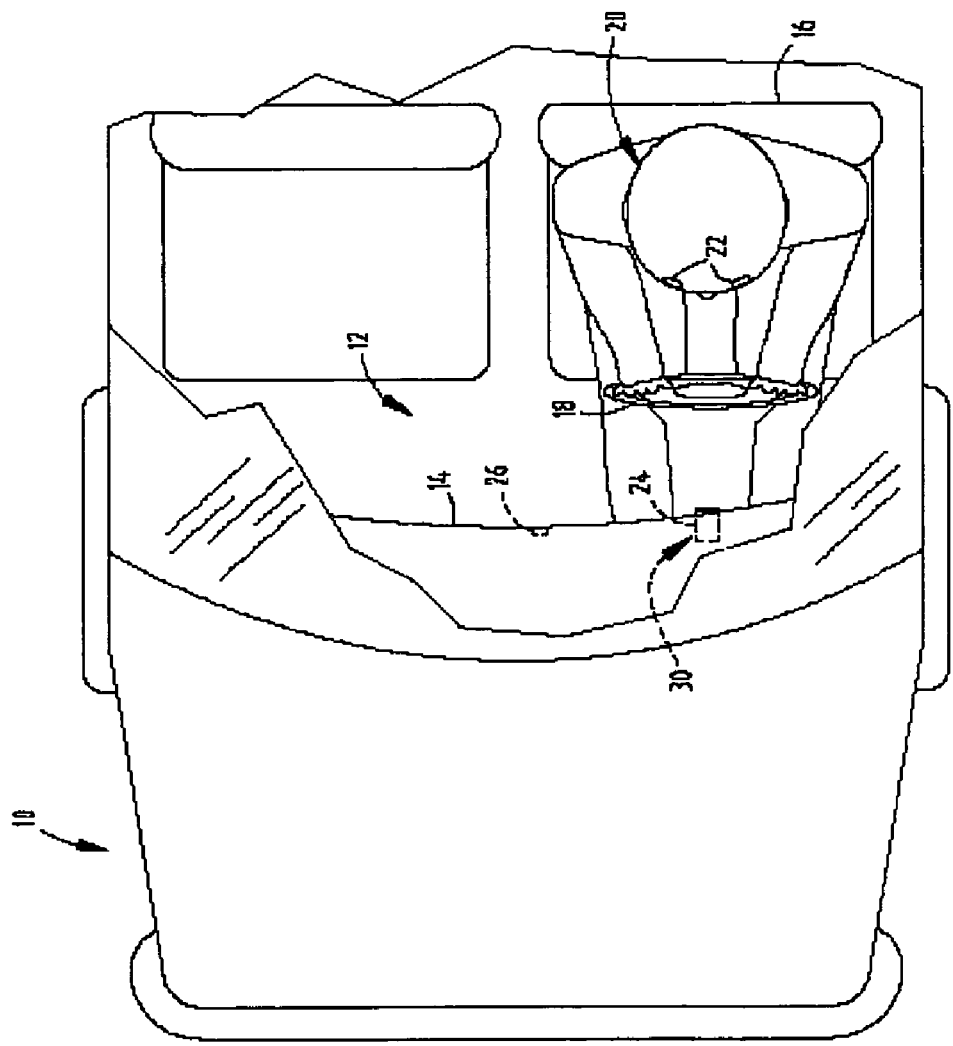
FIG. 1 is a top view of the cockpit of a vehicle equipped with an eye monitoring system for monitoring the eye(s) of a driver of the vehicle.

Referring now to FIG. 1, the passenger compartment (cockpit) 12 of a vehicle is generally shown equipped with a driver monitoring system 30. The eye monitoring system 30 has a video imaging camera 24 oriented and focused on a subject person (driver) 20 driving the vehicle 10 for capturing and generating video images of the driver 20, particularly the driver's face. The eye monitoring system 30 monitors one or both eyes of the person 20 and determines binary eye closure, that is open eye state or closed eye state.

The video imaging camera 24 is shown located generally in front of the driver's seat 16 in the front region of the vehicle cockpit 12. According to one embodiment, video imaging camera 24 is mounted in the instrument cluster, generally within the dash 14 forward of the driver's seat 16. However, the camera 24 may be mounted in other locations onboard the vehicle 10 which allow for acquisition of video images capturing one or both eyes of the driver 20 of the vehicle 10. For example, the video imaging camera 20 may be mounted in the steering assembly 18 or mounted elsewhere in the dash 14. While a single video imaging camera 24 is shown and described herein, it should be appreciated that two or more video imaging cameras may be employed in the eye monitoring system 30, without departing from the teachings of the present invention.

The video imaging camera 24 is arranged to capture successive video image frames of the region where the face of the driver 20 of the vehicle 10 is expected to be located during normal vehicle driving. More particularly, the acquired video images in the successive frames capture the driver's face including one or both eyes 22 and the surrounding ocular features generally found in the area referred to as the ocular adnexa. These features may include one or both eyes 22 and the pupils of the eyes 22, the upper (superior) and lower (inferior) eyelids, and the palpebral fissure space between the eyelids. The acquired video images and the video frames are then processed to determine characteristics of one or both eyes 22 of the subject person (driver) 20. Each video frame image is processed to determine the eye closure state of one or both eyes 22 of the driver 20, such as open eye position and closed eye position states. By knowing the binary eye closure state, the eye monitoring system 30 allows for determination of a driver drowsiness condition, an attentive driver condition and other possible conditions that may utilize the determined binary eye closure state.

The eye monitoring system 30 is also shown employing an optional light illuminator 26 located forward of the driver 20, such as in the central region of the dash 14, for illuminating the face of the driver 20. The light illuminator 26 may include one or more light emitting diodes (LEDs), such as infrared or visible light. Either on-axis or off-axis light illumination may be employed to provide light illumination when desired. The light illuminator 26 may be located anywhere onboard the vehicle 10 sufficient to supply any desired light illumination to enable the camera 24 to acquire video images of the driver's eye(s) 22.

Figure 2:
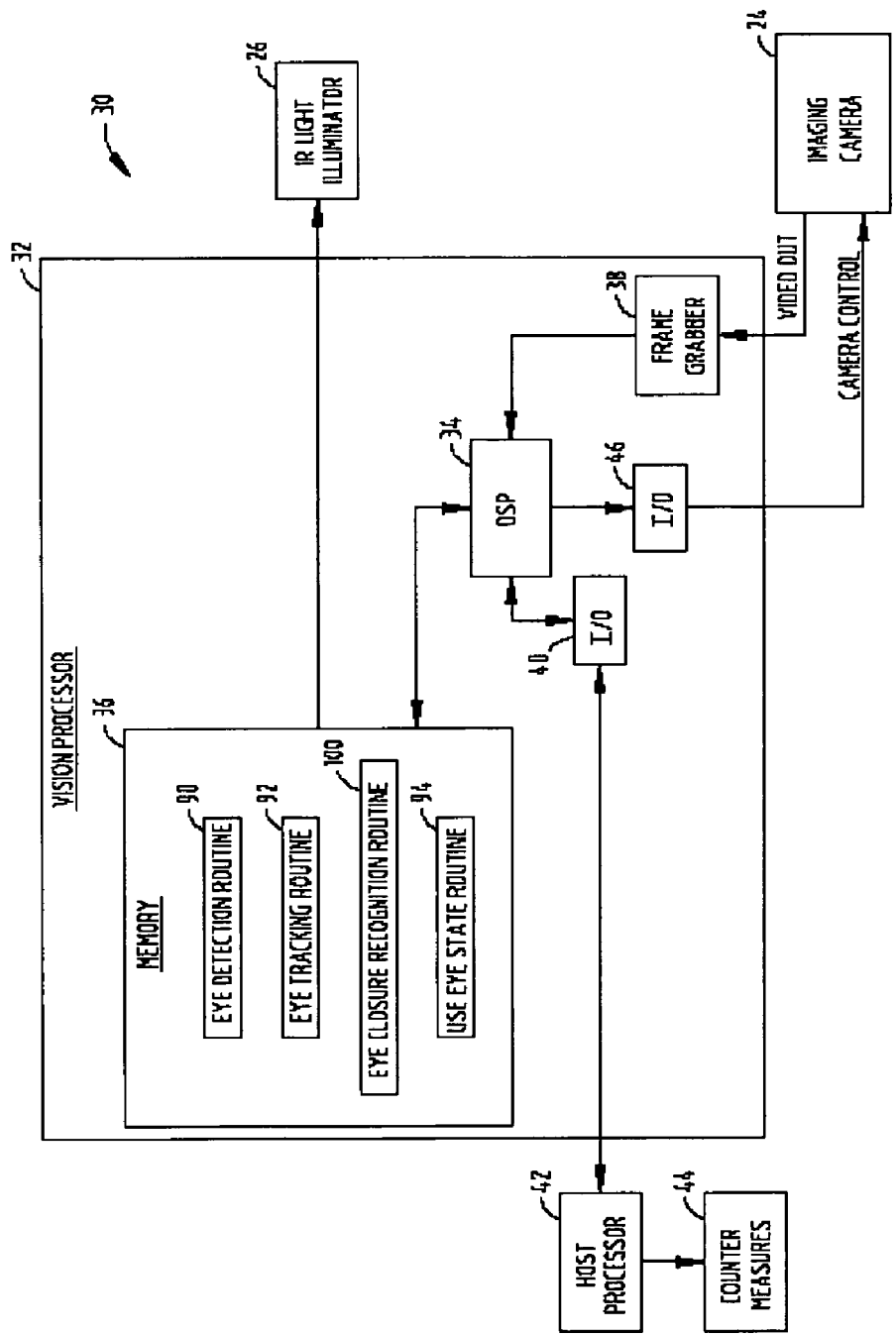
FIG. 2 is a block diagram illustrating the eye monitoring system according to one embodiment of the present invention.

Referring to FIG. 2, the eye monitoring system 30 is shown according to one embodiment having the video imaging camera 24 and an IR light illuminator 26 coupled to a vision processor 32 which, in turn, is coupled to a host processor 42. The video imaging camera 24 may include a CCD/CMOS active-pixel digital image sensor mounted as a chip onto a circuit board. One example of CMOS active-pixel digital image sensor is Model No. PB-0330, commercially available from PhotoBit, which has a resolution defined by an array of 640 horizontal pixels and 480 vertical pixels. It should be appreciated that other imaging cameras may be employed.

The vision (video) processor 32 is shown having a frame grabber 38 for receiving the video output frames generated by the video imaging camera 24. Vision processor 32 also includes a digital signal processor (DSP) 34 for processing the acquired video image frames. The digital signal processor 34 may be a floating point or fixed point processor, according to exemplary embodiments. The vision processor 32 further includes memory 36, such as random access memory (RAM), read-only memory (ROM), and electrically erasable programmable read-only memory (EEPROM), or other memory, as should be readily apparent to those skilled in the art. The vision processor 30 may be configured to perform multiple routines for controlling activation of the light illuminator 26, controlling the video imaging camera 24, processing the acquired video images to determine eye closure state, and applying the processed information to vehicle control systems, such as a host processor 42. Host processor 42 communicates with digital signal processor 34 via input/output interface 40 and provides any of a number of desired countermeasures 44.

The vision processor 32 may provide camera control functions via input/output interface 46, such as control RS-232 logic or I²C bus, which allows for control of the video imaging camera 24 via camera control signals. Control of the video imaging camera 24 may include automatic adjustment of the pointing orientation of the video imaging camera 24. For example, the video imaging camera 24 may be repositioned to focus on an identifiable feature, and may scan a region in search of an identifiable feature, including the driver's face and, more particularly, one or both eyes 22. Camera control may also include adjustment of focus and magnification as may be necessary to track an identifiable feature. Thus, the eye monitoring system 30 may automatically locate and track one or more identifiable features, such as one or both of the driver's eyes 22.

The eye monitoring system 30 includes an eye closure recognition routine 100 stored in memory 36 and executed by the digital signal processor 34 as discussed below. Routine 100 may be implemented as a software program as should be evident to those skilled in the art. The eye closure recognition routine 100 processes the captured video images of the eye 22 to determine the eye closure state, that is, whether the eye is in the open position or in the closed position.

In addition, an eye detection routine 90, an eye tracking routine 92 and an eye state use routine 94 are shown stored in memory 36 and may be executed by the digital signal processor 34. The eye detection routine 90 detects one or both eyes, while the eye tracking routine 92 tracks the detected eye, as should be evident to those in the art. One example of an eye detection routine is disclosed in U.S. application Ser. No. 11/150,684 filed on Jun. 10, 2005, the entire disclosure of which is hereby incorporated herein by reference. The eye state use routine 94 may include any of a number of routines that determine binary eye closure state, which may be further processed by host processor 42 to provide countermeasures 44. These applications include, but are not limited to, driver distraction monitoring, driver gaze monitoring and other applications. By determining the binary eye closure state of the driver of the vehicle, the aforementioned applications and other systems may make use of the eye closure state information to provide enhanced vehicle operation.

Figure 3:
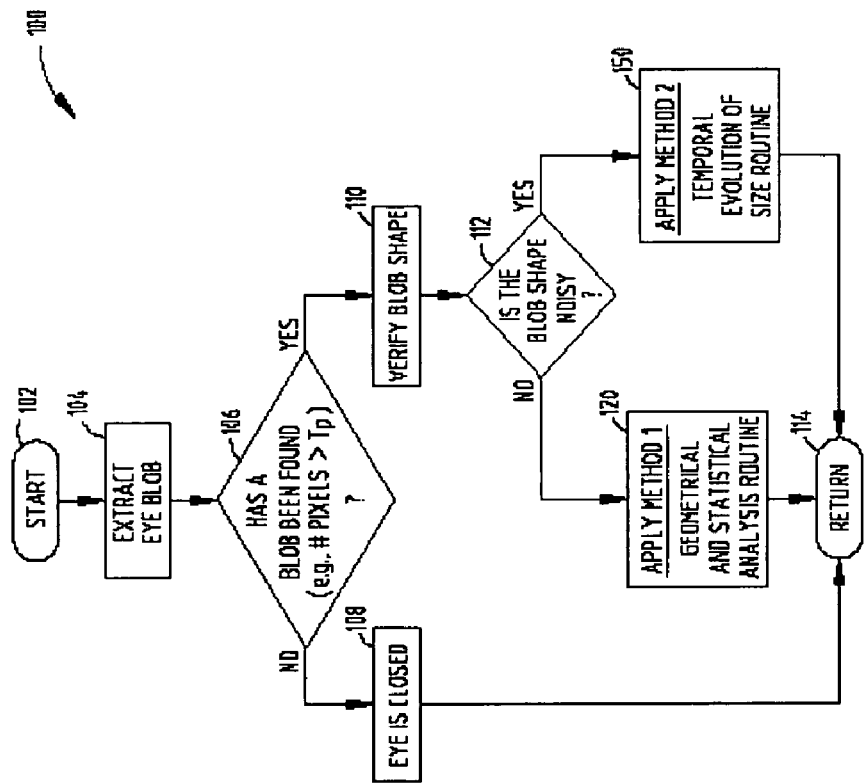
FIG. 3 is a flow diagram illustrating the eye closure recognition routine for determining the eye closure state according to one embodiment of the present invention.
Figure 4:
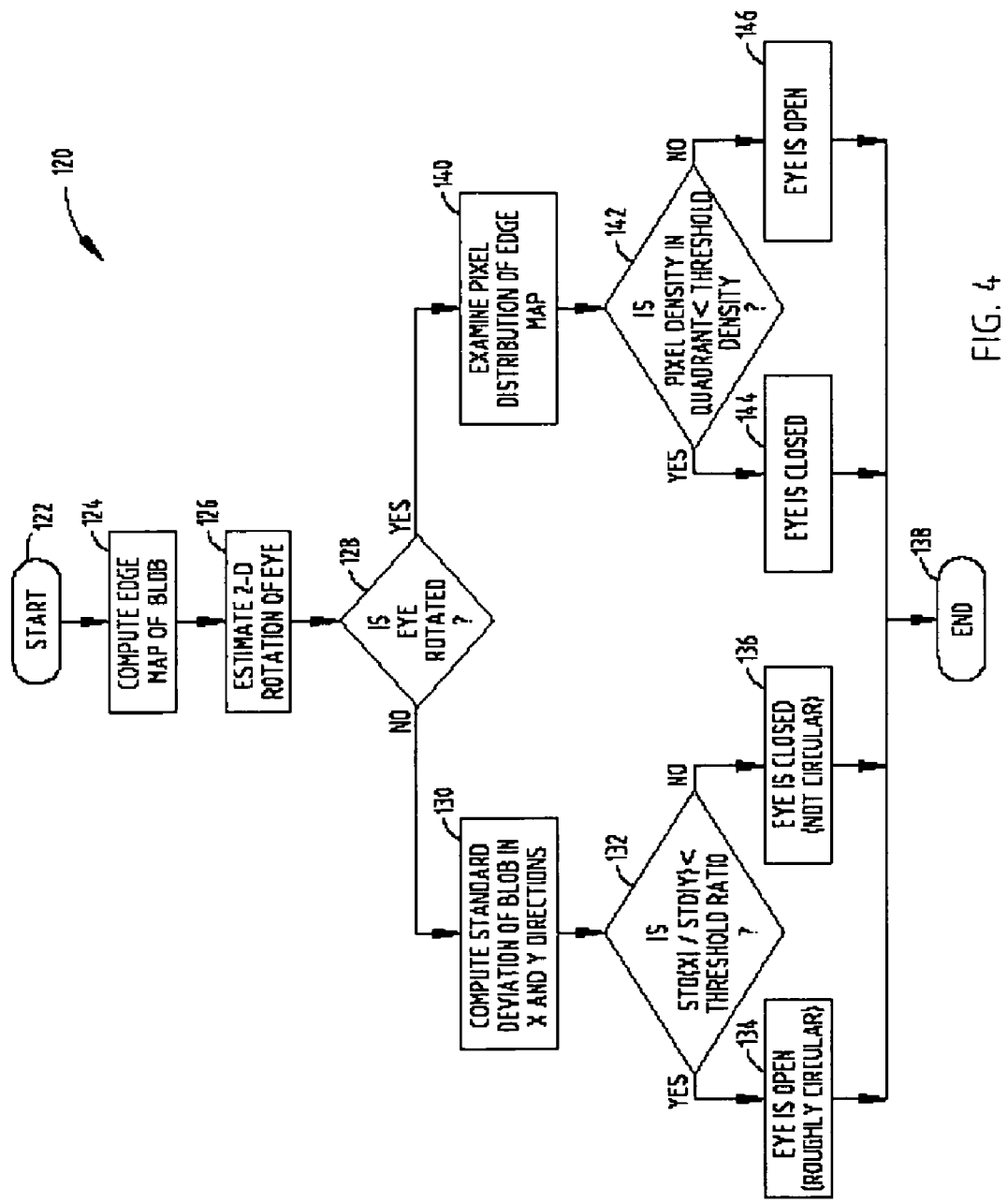
FIG. 4 is a flow diagram illustrating the geometrical and statistical analysis routine employed in the eye closure recognition routine of FIG. 3.
Figure 5:
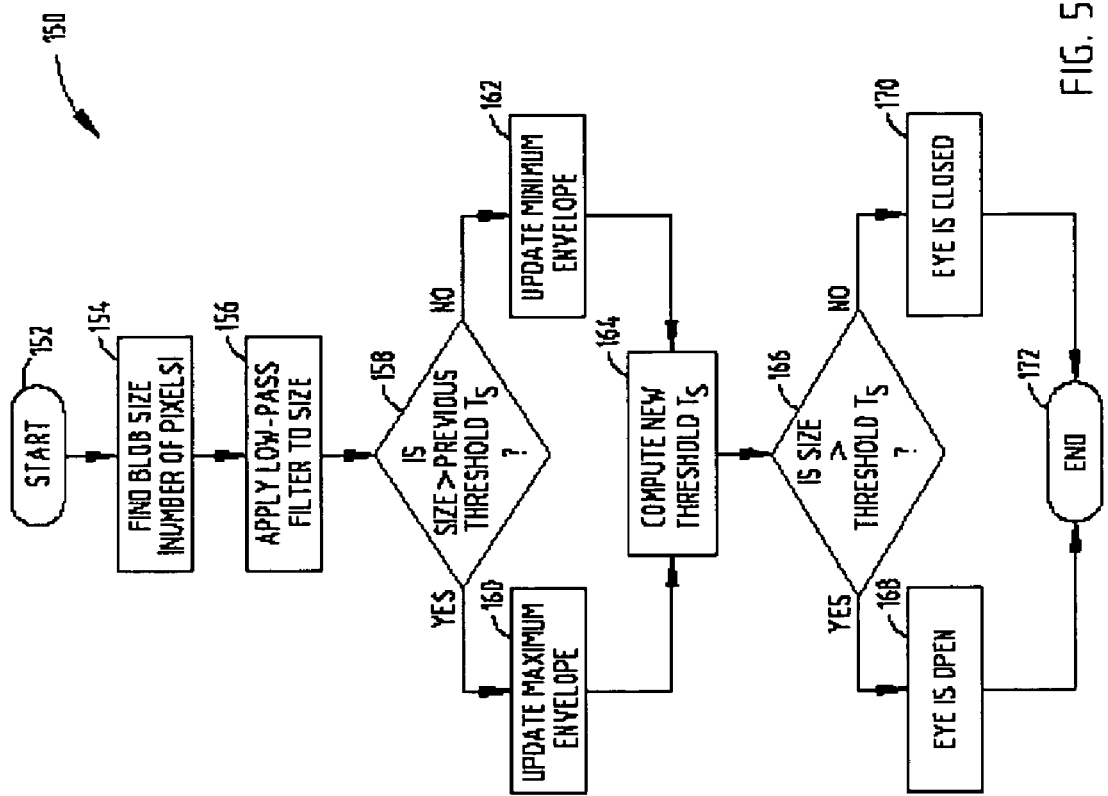
FIG. 5 is a flow diagram illustrating the temporal evolution of size routine employed in the eye closure recognition routine of FIG. 3.
Figure 7A:
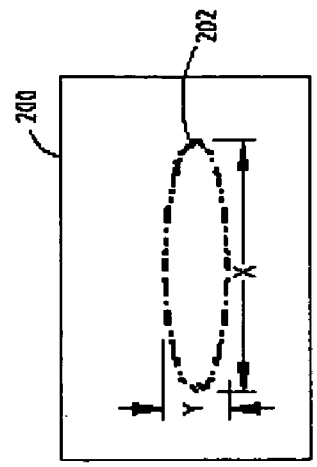
FIG. 7A is a gray-scale enlarged view of the edge boundaries of the eye as captured in the image of FIG. 6A.

Referring to FIGS. 3-5, the eye closure recognition routine 100 is illustrated, according to one embodiment. The eye closure recognition routine 100 is stored as code executable by the digital signal processor 34 to perform discrimination functions and determine if the eye is in the open position or a closed position. It should be appreciated that the eye closure recognition routine 100 processes a detected eye region from the image which is extracted from the video image frame and tracked. Any of a number of eye detection and tracking routines may be employed to provide the extracted eye blob image processed by the eye closure recognition routine 100.

The eye closure recognition routine 100 begins at step 102 and proceeds to extract the eye blob in step 104. Extraction of the eye blob may include extracting an eye patch made up of a rectangular gray-scale window of small size that extracts from the background the entire eye-shape, the eyelashes, the iris and such features expected to be in the region of the eye. According to one example, a receptive dark hole may be extracted from the eye patch by employing a sequence of morphological operators, such as dilation and erosion, followed by an image segmentation procedure like density slicing or binarization. The algorithm extracts the entire eye-shape, the eyelashes, the iris, the dark pupil or nothing (closed eye for light featured subject). At this step, a binary image is produced and the blob in the middle of the eye patch is extracted as the eye blob. It should be clear that any segmentation algorithm that segments the foreground (eye) from the background (skin) could be applied. In doing so, one may assume the intensity of the iris is darker than the intensity of the skin surrounding the eye.

Examples of video images generated with the video imaging camera showing the eye in the open and closed position for both a non-tilted and tilted head are illustrated in FIGS. 6A, 6B, 8A and 8B. As is seen in the example(s), an eye patch or window 200 is extracted which includes the eye blob that is processed according to the present invention. The eye patch 200 is generally captured substantially about the center of the eye. The eye is extracted and tracked and may include a rectangular sub-image having a size of 128 (width) by 64 (height) pixels, according to one example. The eye patch window 200 may be of any shape and is of any sufficient size to capture the outer boundary of the eye including a region greater than the upper and lower edge boundaries and left and right sides of the monitored eye 22. The eye patch window 200 is further illustrated in FIGS. 7A, 7B, 9A and 9B showing the corresponding edge boundaries of the eye 22 as seen in the FIGS. 6A, 6B, 8A and 8B, respectively. The edge boundaries 202 are generally shown as gray-scale images in which the pixels at the edge boundaries 202 exhibit a characteristic shading (e.g., dark gray contrasted with white, or vice versa) that identifies the edge boundaries 202 of the eye 22. The edge map (set of edge pixels) may be computed using a standard edge detector such as the Sobel or Prewitt detectors.

The eye closure recognition routine 100 proceeds to decision step 106 to determine if an eye blob has been found and, if not, determines that the eye is closed in step 108 before returning at step 114. The presence of an eye blob may be based on the number of pixels in the image exceeding a threshold number of pixels $T_P$. If an eye blob has been found, routine 100 proceeds to verify the blob shape in step 110 to determine if the eye blob is noisy (cluttered).

Next, routine 100 determines if the eye blob shape is noisy in decision step 112. The blob shape may be determined in step 110 to be noisy if the eye blob has additional features such as one or more tails extending from the region where the eye is expected to be located. In other words, it is noisy if the eye region is cluttered and presents an artificial appearance of the eye blob. Factors that contribute to a cluttered eye region may include eyeglass frames that overlap the eye, shadows caused by external lighting, eye makeup, or dark sunglasses. Essentially, the routine 100 looks to see if the shape of the eye blob is noisy or clean. The shape is noisy when the eye blob has tails or peaks on different points along its boundary. The following steps may be employed to detect extraneous objects linked to the target eye. The end point on each side of the blob is found. This may include looking from the center and dividing the blob into quadrants and searching each of the quadrants for the end point. Next, the routine checks if the joint horizontal line intersects with the body of the eye blob. For example, if the intersection area over the line is greater than an upper threshold, the blob is identified as "clean." If the intersection is less than a lower threshold, the blob is identified as "noisy."

Sometimes the eye blob may have one or more tails attached to it. The tails generally occur because of shadows near the eye, and sometimes because part of an eyeglass frame may be attached. When this occurs, it is advantageous to detect the presence of tails or other similar features and treat the eye as "noisy," therefore applying an appropriate eye state recognition algorithm. When the blob has these tails and is therefore noisy, the tail distorts the eye closure determination process for the geometric or circularity test ratio of $S_X/S_Y$, since it extends the blob, typically in the X direction. In the noisy eye blob case, enhanced results may be achieved using a temporal evolution or size routine when noisy eye blobs exist. Accordingly, an enhanced eye recognition routine 100 is achieved.

If the blob shape is determined not to be noisy, routine 100 proceeds to apply a first method referred to as the geometrical and statistical routine in step 120. If the blob shape is determined to be noisy, routine 100 instead applies a second method referred to as the temporal evolution of size routine 150. Following either of routines 120 or 150, routine 100 returns at step 114.

Referring to FIG. 4, the geometrical and statistical analysis routine 120 is illustrated starting at step 122 and proceeding to compute an edge map of the eye blob in step 124. The edge map of the eye blob may be determined by employing a known vision processing technique to detect edge boundaries of the eye in the captured image. Edge boundaries may be detected by using the Sobel or Prewitt detectors, for example.

Figure 9A:
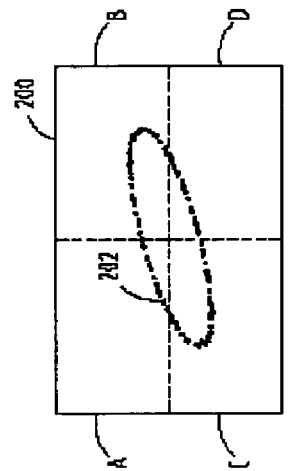
FIG. 9A is a gray-scale enlarged view of the edge boundaries of the eye as captured in the image of FIG. 8A.
Figure 8B:
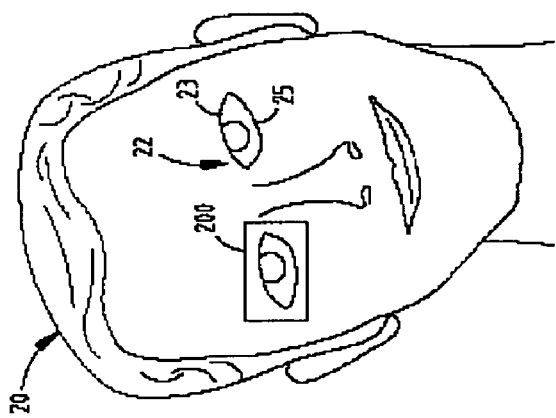
FIG. 8B is a pictorial representation of a video image captured by the camera showing closed eyes with the driver's head rotated.

Next, routine 120 estimates two-dimensional (2-D) rotation of the eye in step 126. The edge map computed in step 124 is divided into four quadrants centered at the center of mass of the eye blob 202 as shown in FIG. 9A. The number of edge pixels contained in each quadrant is computed. Next, the count from each quadrant is normalized by total number of edge pixels, which is referred to as the normalized count or percentage. The symmetry of the eye blob is determined by comparing the percentage of pixels in the upper-left quadrant with the percentage of pixels in the upper-right quadrant, and comparing the percentage of pixels in the lower-left quadrant with the percentage of pixels in the lower-right quadrant. The percentage of pixels in the edge map quadrants also can be represented as follows. Let $n_L^U$ denote the normalized count of edge pixels in the upper-left quadrant, and $n_R^U$, $n_L^L$, $n_R^L$ and denote the upper-right, lower-left and lower-right quadrant counts, respectively. Then, if $|n_L^U - n_R^U| <$ threshold and $|n_L^L - n_R^L| <$ threshold, the eye is roughly symmetrical about the vertical axis and is classified as "non-rotated." If, however, $|n_L^U - n_R^U| \geq$ threshold or $|n_L^L - n_R^L| \geq$ threshold the eye blob is asymmetrical and is classified as "rotated." Note that the edge map from step 124 is not required for the analysis of step 126, and similar results may be achieved using the eye blob found in step 104.

Routine 120 then determines if the eye is rotated in decision step 128. If the eye is determined not to be rotated, routine 100 computes the standard deviation of the pixels contained in the eye blob in the horizontal X and vertical Y directions in step 130. That is, the standard deviation of the X values of the pixel positions $S_X$, is computed along horizontal axis X and the standard deviation of the Y values of the pixels $S_Y$, is computed along vertical axis Y as illustrated in FIGS. 6A, 6B, 7A and 7B. Next, decision step 132 determines if the ratio of $S_X/S_Y$ is less than a threshold ratio. It should be appreciated that by looking at the ratio of the $S_X$ over $S_Y$ the geometrical circularity of the eye is evaluated; if the eye blob is approximately circular then $$\frac{S_X}{S_Y} \approx 1.$$

Figure 6A:
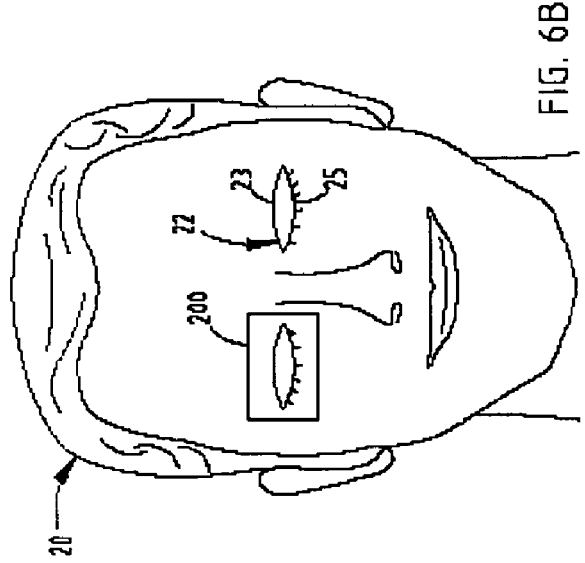
FIG. 6A is a pictorial representation of a video image captured by the camera showing eyes of the driver in the open state.
Figure 6B:
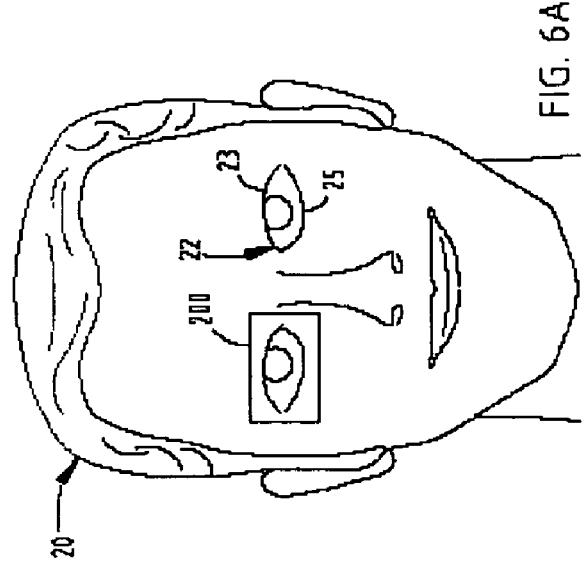
FIG. 6B is a pictorial representation of a video image captured by the camera showing eyes of the driver in the closed state.
Figure 7B:
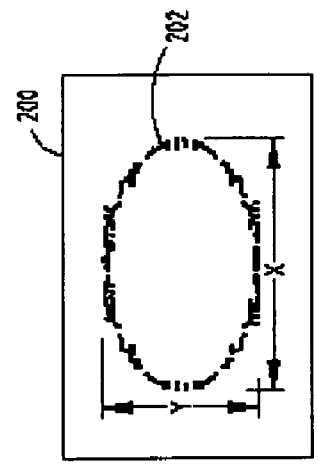
FIG. 7B is a gray-scale enlarged view of the edge boundaries of the eye as captured in the image of FIG. 6B.
Figure 8A:
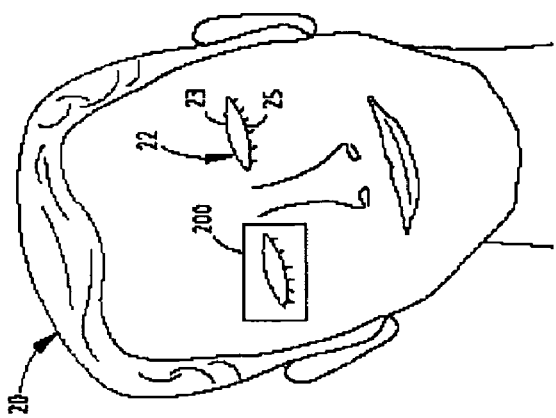
FIG. 8A is a pictorial representation of a video image captured by the camera showing open eyes with the driver's head rotated.

As the eye closes, $S_Y$ decreases, increasing the ratio $S_X/S_Y$. If the ratio is less than the threshold ratio (e.g., a ratio of 3.0), the eye is determined to be open, that is roughly circular, in step 134. This is seen in the example shown in FIGS. 6A and 7A. If the ratio of $S_X/S_Y$ is greater than the threshold ratio, routine 120 proceeds to determine that the eye is closed, that is, not circular, in step 136. An example of the eye determined to be closed is shown in FIGS. 6B and 7B.

Figure 9B:
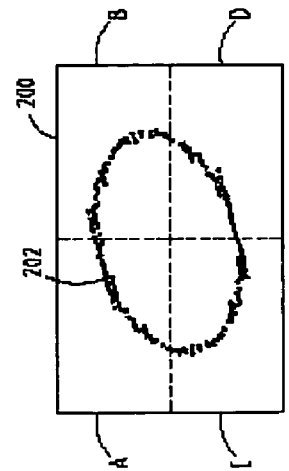
FIG. 9B is a gray-scale enlarged view of the edge boundaries of the eye as captured in the image of FIG. 8B.

If the eye is determined to be rotated in step 128, routine 120 proceeds to examine the perimeter of the eye in each quadrant in step 140. The pixel distribution of the edge map may be examined by looking for a statistical pixel distribution. The pixel distribution is divided into four quadrants of the blob as shown in FIGS. 9A-9B. The count in each quadrant is normalized and denoted as $n_L^U$, $n_R^U$, $n_L^L$, and $n_R^L$, as described above. In decision step 142, if the density in one of the four quadrants is less than a threshold density, then routine 100 classifies the eye as a closed eye in step 144. Otherwise, if the pixel densities in all the quadrants exceed or are equal to the threshold density, routine 120 proceeds to classify the eye as an open eye in step 146. An example of an eye found to be open is shown in FIG. 9A and an example of a closed eye is shown in FIG. 9B. Following classification of the eye as either open or closed, routine 120 ends at step 138.

Accordingly, routine 100 determines an eye closure state based on geometrical and statistical analysis, depending upon whether the eye is rotated. If the eye is not rotated, the routine 120 looks at the eye shape aspect ratio to determine whether it is open or closed. If the eye is rotated, routine 120 looks at the eye shape perimeter and density to determine whether the eye is open or closed.

Figure 10:
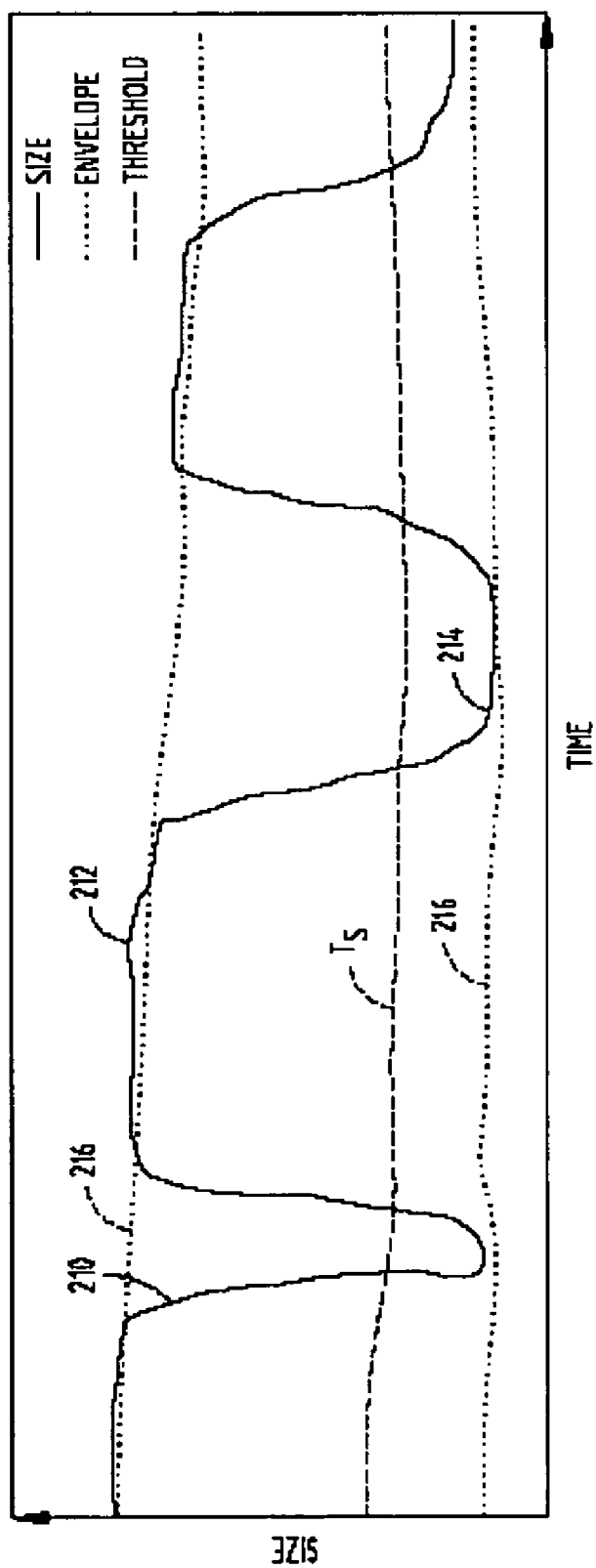
FIG. 10 is a graph illustrating the temporal evolution of size of the eye over time as it changes in comparison to a threshold as processed in the routine in FIG. 5.

Referring to FIG. 5, the temporal evolution of size routine 150 is illustrated beginning at step 152. Routine 150 proceeds to find the size of the eye blob in step 154 which may include determining the number of pixels that are dark in the image of the eye blob. Next, step 156 applies a low-pass filter to the current and previous values of the eye blob size. This reduces noise in the computations from frame to frame. In decision step 158, routine 150 determines if the filtered blob size is greater than the last computed value of the dynamic threshold size $T_S$. If the filtered blob size 212, illustrated in FIG. 10, is greater than the previous threshold size $T_S$, routine 150 proceeds to update the maximum (upper) level of signal envelope 216 in step 160 according to the equation $\text{maximum}_n = \alpha \ast \text{size}_n + (1-\alpha) \ast \text{maximum}_{n-1}$. Step 160 also decays the minimum (lower) level of signal envelope 216 according to the following: $\text{minimum}_n = \gamma \ast \text{maximum}_{n-1} + (1-\gamma) \ast \text{minimum}_{n-1}$. If step 158 determines the eye blob size 212 is less than the threshold $T_S$, step 162 updates the minimum level of envelope 216 according to the following: $\text{minimum}_n = \beta \ast \text{size}_n + (1-\beta) \ast \text{minimum}_{n-1}$, and decays the maximum level of envelope 216 according to the following: $\text{maximum}_n = \gamma \ast \text{minimum}_{n-1} + (1-\gamma) \ast \text{maximum}_{n-1}$. Routine 150 proceeds to compute the new value of the threshold $T_S$ in step 164 using the equation $T_S = (1-\delta) \ast \text{minimum}_n + \delta \ast \text{maximum}_n$. In the preceding equations, the constants $\alpha$ and $\beta$ are selected to set the adaptation rate of the signal envelopes, while $\gamma$ sets the envelope decay rate, and $\delta$ is chosen to set the threshold $T_S$.

Following computation of the new threshold $T_S$, routine 150 proceeds to determine if the blob size is greater than the new threshold $T_S$ in decision step 166. If the eye blob size is greater than threshold $T_S$, routine 150 determines the eye is open in step 168 before ending at step 172. If the eye blob size is not determined to be greater than the threshold $T_S$, routine 150 determines the eye is closed in step 170 before ending at step 172.

Routine 150 is further illustrated in the example shown in FIG. 10 which illustrates how the routine determines the state of the tracked eye and the eye blob size tracked over time. As seen, the upper and lower signal envelopes 216 of the size are found. The upper and lower envelope values 216, herein referred to as maximum and minimum values, are used to compute the dynamic threshold $T_S$. The current eye blob size is compared against the threshold $T_S$ to classify the eye as either open or closed. In the graph shown in FIG. 10, the size 210 is shown within a maximum and minimum envelope 216, and in relation to the dynamic threshold $T_S$. To determine which signal envelope to update, the current size is compared against the previous threshold $T_S$. If the size is greater than the threshold, the maximum is updated. If it is less, the minimum is updated. Over intervals where a signal envelope is not updated, the value is allowed to decay (maximum envelope decays to smaller values, minimum decays to larger values) to ensure the adaptation does not become locked in an incorrect state. Because of the decision-based feedback, the time to initial convergence may vary based on the initial conditions. Further, to aid in the initial convergence, knowledge of the subject eye closure patterns may be employed. No assumption may be made about the duration of the eye closure; however, one may assume that the eye will not be open for an excessive period, such as in excess of six seconds. If an extended open state of the eye is observed, the signal envelope may be adjusted to force a more rapid adaptation. The attack rate for the adaptation of the signal envelope may be varied to improve performance. The rate may also be set individually for each of the maximum and minimum envelopes, as well as for the direction of adaptation, for a total of four or more configurable rates, according to one embodiment.

Accordingly, routine 150 essentially determines the binary eye state based on the eye blob size function. The size of the eye blob is essentially computed in each frame, and monitored over time. The upper and the lower signal envelopes of the function are determined. The upper and lower envelope values (i.e., maximum and minimum values) are then used to compute a dynamic threshold. The eye state is determined by comparing the current eye blob size against the dynamic threshold.

Accordingly, the eye monitoring system 30 of the present invention advantageously captures and processes images of the eye and determines the eye closure state. The eye monitoring system 30 of the present invention is economical and easy to manufacture and deploy in a vehicle. It should be appreciated that the eye monitoring system 30 may be employed in various applications both on and off a vehicle, without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for determining closure state of an eye of a subject, said system comprising:
   a video imaging camera oriented to generate images of an eye of a subject; and
   a video processor for processing the images generated with the video imaging camera, said video processor detecting an eye in the images and determining if the images of the eye are noisy, said video processor determining closure state of the eye based on a shape of the eye in the images if the images of the eye are not noisy, and based on changes in a size of the eye over time if the images of the eye are noisy to determine whether the eye is in an open or closed state.

2. The system as defined in claim 1, wherein said video processor determines geometrical shape of the eye by determining horizontal and vertical dimensions of the eye and comparing a ratio of the horizontal and vertical dimensions of the eye to a threshold ratio.

3. The system as defined in claim 2, wherein the video processor determines the eye is in an open state when the ratio of the horizontal to vertical dimensions is less than the threshold ratio.

4. The system as defined in claim 3, wherein the video processor determines the eye is closed when the ratio of the horizontal to vertical dimensions exceeds the threshold ratio.

5. The system as defined in claim 1, wherein the video processor determines whether the eye is classified as rotated and further determines geometrical shape of the eye as a function of determined eye rotation.

6. The system as defined in claim 5, wherein the video processor determines eye closure based on density of pixels within predefined regions of the images when the eye is determined to be classified as rotated.

7. The system as defined in claim 1, wherein the system is employed in a vehicle for monitoring an eye of a driver of the vehicle.

8. An eye monitoring system for monitoring an eye of a subject, said system comprising:
   a video imaging camera oriented to generate images of an eye of a subject; and
   a video processor for processing the images generated with the video imaging camera, said video processor detecting an eye in the images and determining changes in the size of the eye over time, wherein the video processor determines closure state of the eye based on the changes in the size of the eye over time, wherein said video processor determines a size of the eye over time and compares the size of the eye to a threshold size, wherein the eye is determined to be open when the size of the eye exceeds the threshold size, wherein the threshold size is computed based on an envelope defining the size difference between open and closed positions of the eye over time.

9. The system as defined in claim 8, wherein the video processor further determines if the images of the eye are noisy and determines closure state of the eye based on a geometric and statistical analysis of the shape of the eye in the images if the images of the eye are not noisy, and based on changes in the size of eye over time if the images of the eye are noisy to determine if the eye is in the open or closed state.

10. The system as defined in claim 8, wherein said video processor determines geometrical shape of the eye by determining horizontal and vertical dimensions of the eye and comparing a ratio of the horizontal and vertical dimensions of the eye to a threshold ratio.

11. The system as defined in claim 10, wherein the video processor determines the eye is in an open state when the ratio of the horizontal to vertical dimensions is less than the threshold ratio.

12. The system as defined in claim 8, wherein the video processor determines the eye is closed when a ratio of the horizontal to vertical dimensions exceeds the threshold ratio.

13. The system as defined in claim 8, wherein the video processor determines whether the eye is classified as rotated and further determines geometrical shape of the eye as a function of determined eye rotation.

14. The system as defined in claim 13, wherein the video processor determines eye closure based on density of pixels within predefined regions of the image when the eye is determined to be classified as rotated.

15. The system as defined in claim 8, wherein the system is employed in a vehicle for monitoring an eye of a driver of the vehicle.

16. An eye monitoring system for monitoring an eye of a subject, said system comprising:
- a video imaging camera oriented to generate images of an eye of a subject; and
- a video processor for processing the images generated with the video imaging camera, said video processor detecting an eye in the images and determining geometrical shape of the eye in the images including horizontal and vertical dimensions and a ratio of the horizontal to vertical dimensions of the eye, wherein the video processor determines closure state of the eye based on the ratio of horizontal to vertical dimensions of the eye, wherein the video processor determines the eye is in an open state when the ratio of horizontal to vertical dimensions is less than a threshold ratio.

17. The system as defined in claim 16, wherein the video processor determines the eye is closed when the ratio of the horizontal to vertical dimensions exceeds the threshold ratio.

18. The system as defined in claim 16, wherein the video processor determines whether the eye is classified as rotated and further determines geometrical shape of the eye as a function of determined eye rotation.

19. The system as defined in claim 18, wherein the video processor determines eye closure based on statistical analysis of density of pixels within predefined regions of the images when the eye is determined to be classified as rotated.

20. The system as defined in claim 16, wherein the video processor determines if the images of the eye are noisy and determines closure state of the eye based on the ratio of horizontal and vertical dimensions when the images of the eye are not noisy, and based on changes in a size of the eye over time if the images of the eye are noisy.

21. The system as defined in claim 20, wherein the video processor determines changes in the size of the eye as a function of a threshold value that changes based on an envelope defining the open and closed positions of the eye over time.

22. The system as defined in claim 16, wherein the system is employed in a vehicle for monitoring an eye of a driver of the vehicle.

23. A method of determining eye closure state of an eye of the subject, said method comprising the steps of:
- arranging a video imaging camera to generate images of an eye of a subject;
- generating the images of the eye of the subject with the video imaging camera;
- processing the images to identify edges of the eye in the images;
- determining if the images of the eye are noisy;
- determining a geometrical shape of the eye if the images of the eye are not noisy;
- performing a temporal evaluation of the eye if the images of the eye is noisy; and
- determining closure state of the eye in the images as a function of the geometrical shape or the temporal evaluation of the eye.

* * * * *